United States Patent
Ikejiri et al.

(10) Patent No.: US 11,552,329 B2
(45) Date of Patent: Jan. 10, 2023

(54) SOLID ELECTROLYTE SHEET, METHOD FOR PRODUCING SAME AND ALL-SOLID-STATE SECONDARY BATTERY

(71) Applicant: NIPPON ELECTRIC GLASS CO., LTD., Otsu (JP)

(72) Inventors: Junichi Ikejiri, Otsu (JP); Hideo Yamauchi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 234 days.

(21) Appl. No.: 16/642,946

(22) PCT Filed: Sep. 10, 2018

(86) PCT No.: PCT/JP2018/033446
§ 371 (c)(1),
(2) Date: Feb. 28, 2020

(87) PCT Pub. No.: WO2019/059024
PCT Pub. Date: Mar. 28, 2019

(65) Prior Publication Data
US 2020/0194826 A1    Jun. 18, 2020

(30) Foreign Application Priority Data

Sep. 20, 2017 (JP) .............................. JP2017-180070
Sep. 20, 2017 (JP) .............................. JP2017-180071
Jul. 26, 2018 (JP) .............................. JP2018-140021
Jul. 26, 2018 (JP) .............................. JP2018-140022

(51) Int. Cl.
*H01M 10/0562* (2010.01)
*H01M 10/054* (2010.01)
(Continued)

(52) U.S. Cl.
CPC ......... *H01M 10/0562* (2013.01); *C01B 33/12* (2013.01); *C01F 7/02* (2013.01); *H01B 1/08* (2013.01); *H01M 10/054* (2013.01)

(58) Field of Classification Search
None
See application file for complete search history.

(56) References Cited

U.S. PATENT DOCUMENTS

2013/0337309 A1    12/2013   Virkar et al.
2017/0005337 A1*   1/2017    Ikejiri ................ H01M 10/054
(Continued)

FOREIGN PATENT DOCUMENTS

CN    104685694 A    6/2015
CN    105637694 A    6/2016
(Continued)

OTHER PUBLICATIONS

Official Communication issued in International Patent Application No. PCT/JP2018/033446, dated Nov. 20, 2018.
(Continued)

*Primary Examiner* — Christopher P Domone
(74) *Attorney, Agent, or Firm* — Keating and Bennett, LLP (57) ABSTRACT

Provided are a sodium ion-conductive crystal-containing solid electrolyte sheet capable of giving excellent battery characteristics even when reduced in thickness, and an all-solid-state battery using the same. The solid electrolyte sheet contains at least one type of sodium ion-conductive crystal selected from β"-alumina and NASICON crystal and has a thickness of 500 μm or less and a flatness of 200 μm or less.

13 Claims, 3 Drawing Sheets

(51) Int. Cl.
    *C01B 33/12*     (2006.01)
    *C01F 7/02*     (2022.01)
    *H01B 1/08*     (2006.01)

(56) References Cited

U.S. PATENT DOCUMENTS

2018/0183044 A1     6/2018   Yamauchi
2018/0183094 A1     6/2018   Ikejiri et al.
2018/0309165 A1*  10/2018  Yersak ................ H01M 10/054

FOREIGN PATENT DOCUMENTS

| | | | |
|---|---|---|---|
| JP | 05-205741 A | | 8/1993 |
| JP | 2009-193894 A | | 8/2009 |
| JP | 2010-015782 A | | 1/2010 |
| JP | 2015-523681 A | | 8/2015 |
| JP | 2017-103146 A | | 6/2017 |
| WO | 2012/063827 A1 | | 5/2012 |
| WO | WO2015087734 | * | 6/2015 |
| WO | 2017/026285 A1 | | 2/2017 |
| WO | 2017/073457 A1 | | 5/2017 |

OTHER PUBLICATIONS

Official Communication issued in corresponding Japanese Patent Application No. 2018-140021, dated Feb. 9, 2022.
Official Communication issued in corresponding Japanese Patent Application No. 2018-140022, dated Feb. 14, 2022.
Official Communication issued in corresponding Chinese Patent Application No. 201880045205.8, dated Oct. 18, 2022.

\* cited by examiner

SOLID ELECTROLYTE SHEET, METHOD FOR PRODUCING SAME AND ALL-SOLID-STATE SECONDARY BATTERY

TECHNICAL FIELD

The present invention relates to sodium ion-conductive crystal-containing solid electrolyte sheets for use in power storage devices, such as sodium ion secondary batteries, methods for producing the same, and sodium ion all-solid-state secondary batteries.

BACKGROUND ART

Lithium ion secondary batteries have secured their place as high-capacity and light-weight power sources essential for mobile devices, electric vehicles, and so on. However, current lithium ion secondary batteries employ as their electrolytes, mainly, combustible organic electrolytic solutions and, therefore, raise concerns about the risk of ignition or the like. As a solution to this problem, developments of lithium ion all-solid-state batteries using a solid electrolyte instead of an organic electrolytic solution have been promoted (see, for example, Patent Literature 1).

However, an issue of concern with lithium is global price increase of raw and processed materials therefor. To cope with this, sodium has attracted attention as a material to replace lithium and there is proposed a sodium ion all-solid-state battery in which NASICON-type sodium ion-conductive crystals made of $Na_3Zr_2Si_2PO_{12}$ are used as a solid electrolyte (see, for example, Patent Literature 2). Alternatively, beta-alumina-based solid electrolytes, including $\beta$-alumina and $\beta''$-alumina, are also known to exhibit high sodium-ion conductivity. These solid electrolytes are also used as solid electrolytes for sodium-sulfur batteries.

In relation to all-solid-state batteries, a smaller thickness of the solid electrolyte is preferred because the resistance to ion migration in a battery (for example, a sodium ion all-solid-state battery) becomes smaller and the energy density per unit volume becomes higher. Therefore, there is a demand to reduce the thickness of the solid electrolyte (produce a sheet-form solid electrolyte).

CITATION LIST

Patent Literature

[PTL 1]
JP-A-H05-205741
[PTL 2]
JP-A-2010-15782

SUMMARY OF INVENTION

Technical Problem

If the thickness of the solid electrolyte is reduced, the internal resistance of the battery tends to increase, which presents a problem that the battery characteristics, such as discharge capacity and operating voltage, decrease.

Therefore, the present invention has an object of providing, as a first aspect, a sodium ion-conductive crystal-containing solid electrolyte sheet capable of giving excellent battery characteristics even when reduced in thickness, and an all-solid-state battery using the same.

Furthermore, a sheet-form solid electrolyte is produced, for example, by a method (green sheet method) of making a raw material powder for the solid electrolyte into a slurry, forming a green sheet from the slurry, and then firing the green sheet. However, when a sodium ion-conductive crystal-containing solid electrolyte sheet is produced by the above method, there arises a problem that its ionic conductivity is likely to decrease. As a result, an all-solid-state battery produced using the above solid electrolyte sheet tends to have a low discharge capacity.

Therefore, the present invention has another object of providing, as a second aspect, a sodium ion-conductive crystal-containing solid electrolyte sheet having a high ionic conductivity, and a sodium ion all-solid-state battery using the same.

Solution to Problem

A solid electrolyte sheet according to a first aspect of the present invention contains at least one type of sodium ion-conductive crystal selected from $\beta''$-alumina and NASICON crystal and has a thickness of 500 μm or less and a flatness of 200 μm or less.

Figure 1:
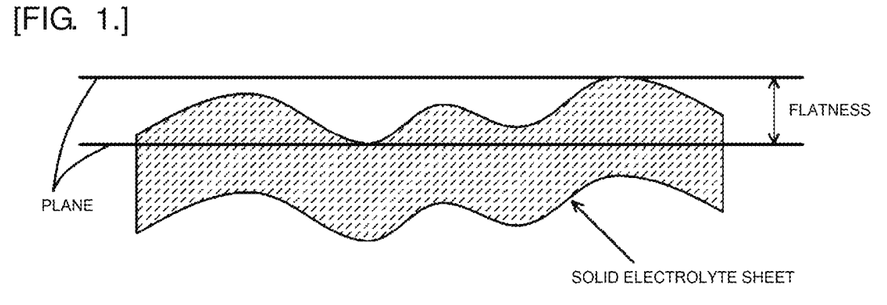
FIG. 1 is a schematic cross-sectional view for illustrating the flatness of a solid electrolyte sheet.

Studies by the inventors have found that the reason why a reduction in thickness of a solid electrolyte leads to increased internal resistance of a battery is attributable to the flatness of the solid electrolyte. In JIS, the term flatness is defined as "the magnitude of a deviation from the geometrically precise plane of a plane form." FIG. 1 is a schematic cross-sectional view for illustrating the flatness of a solid electrolyte sheet. As shown in FIG. 1, the flatness of a solid electrolyte sheet indicates the magnitude of a gap created when one surface of the sheet is sandwiched between two parallel planes. If the value of the flatness of the solid electrolyte is large, an electrode material cannot uniformly be applied to the surface of the solid electrolyte, so that the electrode has an uneven thickness and therefore undergoes a local increase in internal resistance. Hence, by making the solid electrolyte to have a small flatness as described above, the thickness of the electrode can be uniform, so that the internal resistance of the battery can be small. As a result, the battery characteristics, such as discharge capacity and operating voltage, can be increased. Furthermore, when the flatness of the solid electrolyte is small, the handleability increases, so that the occurrence of cracks and so on during production of the battery can be reduced.

A solid electrolyte sheet according to a second aspect of the present invention is a solid electrolyte sheet containing at least one type of sodium ion-conductive crystal selected from $\beta''$-alumina and NASICON crystal, wherein when $C_1$ represents a $Na_2O$ concentration at a depth of 5 μm from a surface of the solid electrolyte sheet and $C_2$ represents a $Na_2O$ concentration at a depth of 20 μm from the surface, $C_2 - C_1 \leq 10\%$ by mole.

Studies by the inventors have found that the ionic conductivity of a solid electrolyte sheet correlates with the $Na_2O$ concentration in the surface layer of the sheet. Specifically, it has been found that when the $Na_2O$ concentration in the sheet surface layer decreases, the ionic conductivity of the solid electrolyte sheet decreases. In view of this, when the $Na_2O$ concentration in the surface layer of the solid electrolyte sheet is made relatively large (the difference from the $Na_2O$ concentration in the inside of the sheet is made small), the ionic conductivity can be increased.

Another solid electrolyte sheet according to the second aspect of the present invention is a solid electrolyte sheet containing at least one type of sodium ion-conductive crystal selected from $\beta''$-alumina and NASICON crystal, wherein when, with a thickness of the solid electrolyte sheet represented as 100%, $C_1'$ represents a $Na_2O$ concentration at a depth of 5% from a surface of the solid electrolyte sheet and $C_2'$ represents a $Na_2O$ concentration at a depth of 50% from the surface, $C_2'-C_1' \leq 10\%$ by mole.

The solid electrolyte sheet according to the second aspect of the present invention preferably has a thickness of 500 μm or less. When the solid electrolyte sheet is made thin as just described, it is preferred because the resistance to ion migration in the resultant battery decreases and the energy density per volume increases.

The solid electrolyte sheets according to the first and second aspects of the present invention preferably contain, in terms of % by mole, 65 to 98% $Al_2O_3$, 2 to 20% $Na_2O$, 0.3 to 15% $MgO+Li_2O$, 0 to 20% $ZrO_2$, and 0 to 5% $Y_2O_3$. Note that "(component)+(component)+ . . . " as used herein means the total sum of the contents of the mentioned components.

The solid electrolyte sheets according to the first and second aspects of the present invention preferably contain crystals represented by a general formula $Na_sA1_tA2_uO_v$ (where A1 is at least one selected from Al, Y, Yb, Nd, Nb, Ti, Hf, and Zr, A2 is at least one selected from Si and P, s=1.4 to 5.2, t=1 to 2.9, u=2.8 to 4.1, and v=9 to 14).

The solid electrolyte sheets according to the first and second aspects of the present invention are suitable for all-solid-state sodium ion secondary batteries.

An all-solid-state secondary battery according to the present invention is an all-solid-state battery including a positive electrode composite layer, a solid electrolyte layer, and a negative electrode composite layer, wherein the solid electrolyte layer is formed of the above-described solid electrolyte sheet according to the first or second aspect.

A method for producing a solid electrolyte sheet according to the present invention is a method for producing the above-described solid electrolyte sheet according to the first or second aspect and includes the steps of: (a) pre-firing a raw material powder; (b) making the pre-fired raw material powder into a slurry; (c) applying the slurry on a support and drying the slurry to obtain a green sheet; and (d) firing the green sheet to form sodium ion-conductive crystals.

When a solid electrolyte sheet is produced by the green sheet method, there arises a problem that the flatness of the solid electrolyte sheet is deteriorated by contraction during firing. To cope with this, a raw material powder is previously pre-fired to produce a composite oxide (for example, β-alumina) as a precursor and the composite oxide is converted to sodium ion-conductive crystals by later firing (for example, β-alumina is changed in phase to β''-alumina). Thus, the contraction during firing can be reduced and the deterioration in flatness of the solid electrolyte sheet can be therefore reduced.

Furthermore, particularly when the thickness of the green sheet is made small, cracks may be formed in the sheet during firing. This can be attributed to the release of carbon dioxide from a carbonate raw material and volatilization of a sodium component and so on during firing. When the raw material powder is pre-fired to previously cause the release of carbon dioxide and the volatilization of a sodium component and so on, the release of carbon dioxide and the volatilization of the sodium component and so on during the later firing can be reduced, so that problems of the deterioration in flatness of the solid electrolyte sheet and the formation of cracks in the solid electrolyte sheet can be reduced.

In addition, studies by the inventors have found that, during firing of a green sheet in the production of a solid electrolyte sheet, a sodium component volatilizes from the surface of the green sheet, so that the $Na_2O$ concentration in the surface layer of the solid electrolyte sheet decreases and the ionic conductivity therefore decreases. In this regard, it can be considered that when the sodium component volatilizes from the surface of the green sheet, a sodium-free other crystal layer (for example, a $MgAl_2O_4$ layer) is formed on the surface layer of the solid electrolyte sheet, so that the ionic conductivity decreases. The other crystal layer has a problem that particularly when the thickness of the solid electrolyte sheet is small, an attempt to remove the other crystal layer by polishing is likely to cause cracking and chipping of the sheet. Unlike this, when the raw material powder is previously pre-fired, the volatilization of the sodium component and so on during the later firing can be reduced, so that the ionic conductivity of the solid electrolyte sheet can be increased. This can be attributed to the fact that the raw material powder is pre-fired to produce a composite oxide (for example, β-alumina) as a precursor, the composite oxide is converted to sodium ion-conductive crystals by the later firing (for example, β-alumina is changed in phase to β''-alumina), and the sodium component in the composite oxide is difficult to volatilize during the firing.

In the method for producing a solid electrolyte sheet according to the present invention, the green sheet is preferably fired on an MgO setter. If during firing of the green sheet the raw material powder reacts with a setter, the $Na_2O$ concentration in the surface layer of the solid electrolyte sheet may decrease. However, an MgO setter has low reactivity particularly with a raw material powder for use in producing a solid electrolyte sheet containing β''-alumina. Therefore, the reaction of the raw material powder with the setter during firing of a green sheet can be reduced, so that the decrease in $Na_2O$ concentration in the surface layer of the solid electrolyte sheet can be reduced.

In the step (d) in the method for producing a solid electrolyte sheet according to the present invention, the firing is preferably performed in a state where the green sheet is placed between an upper setter and a lower setter and a clearance is provided between the green sheet and the upper setter. In this case, the clearance is preferably 1 to 500 μm. By doing so, the deterioration in flatness and the formation of cracks due to contraction of the green sheet during firing can be further reduced. Specifically, since the green sheet is sandwiched between the setters, the occurrence of undulation due to contraction of the green sheet during firing can be reduced. Since a slight clearance is provided between the green sheet and the upper setter, the green sheet can moderately contract without being excessively constrained by the setters during firing, so that strain is less likely to occur and the formation of cracks can be reduced.

Advantageous Effects of Invention

The present invention enables provision of a sodium ion-conductive crystal-containing solid electrolyte sheet capable of giving excellent battery characteristics even when reduced in thickness, and an all-solid-state battery using the same. Furthermore, the present invention enables provision of a sodium ion-conductive crystal-containing solid electrolyte sheet having a high ionic conductivity, and a sodium ion all-solid-state battery using the same.

DESCRIPTION OF EMBODIMENTS

Solid electrolyte sheets according to first and second aspects of the present invention contain at least one type of sodium ion-conductive crystal selected from β"-alumina and NASICON crystal. β"-alumina and NASICON crystal are preferred because they have excellent sodium-ion conductivity, high electron insulating properties, and excellent stability.

The solid electrolyte sheet according to the first aspect of the present invention is characterized by containing at least one type of sodium ion-conductive crystal selected from β"-alumina and NASICON crystal and having a thickness of 500 µm or less and a flatness of 200 µm or less.

A smaller thickness of the solid electrolyte sheet is more preferred because the distance taken to conduct ions in the solid electrolyte becomes shorter to increase the ionic conductivity. Furthermore, with the use of the solid electrolyte sheet as a solid electrolyte for an all-solid-state battery, the all-solid-state battery has a higher energy density per unit volume. Specifically, the thickness of the solid electrolyte sheet according to the first aspect of the present invention is 500 µm or less, preferably 400 µm or less, more preferably 300 µm or less, and particularly preferably 200 µm or less. However, if the thickness of the solid electrolyte sheet is too small, the mechanical strength may decrease and the positive and negative electrodes may be short-circuited. Therefore, the thickness is preferably not less than 5 µm, more preferably not less than 10 µm, still more preferably not less than 20 µm, yet still more preferably not less than 30 µm, and particularly preferably not less than 50 µm.

The flatness of the solid electrolyte sheet according to the first aspect of the present invention is 200 µm or less, preferably 150 µm or less, more preferably 100 µm or less, and particularly preferably 50 µm or less. If the value of flatness is too large, an electrode material cannot uniformly be applied to the surface of the solid electrolyte, so that the electrode has an uneven thickness and therefore undergoes a local increase in internal resistance. As a result, the battery characteristics, such as discharge capacity, operating voltage, and, furthermore, rate characteristic, tend to decrease. The lower limit of the value of flatness is not particularly limited, but it is, actually, preferably not less than 1 µm and more preferably not less than 5 µm.

The solid electrolyte sheet according to the second aspect of the present invention is characterized in that when $C_1$ represents a $Na_2O$ concentration at a depth of 5 µm from a surface of the solid electrolyte sheet and $C_2$ represents a $Na_2O$ concentration at a depth of 20 µm from the surface, $C_2-C_1$ 10% by mole. If $C_2-C_1$ is too large, the ionic conductivity of the solid electrolyte sheet is likely to decrease. Therefore, $C_2-C_1$ is preferably 8% by mole or less, more preferably 6% by mole or less, and particularly preferably 3% by mole or less.

As another point of view, the solid electrolyte sheet according to the second aspect of the present invention is characterized in that when, with the thickness of the solid electrolyte sheet represented as 100%, $C_1'$ represents a $Na_2O$ concentration at a depth of 5% from a surface of the solid electrolyte sheet and $C_2'$ represents a $Na_2O$ concentration at a depth of 50% from the surface, $C_2'-C_1'$ 10% by mole. If $C_2'-C_1'$ is too large, the ionic conductivity of the solid electrolyte sheet is likely to decrease. Therefore, $C_2'-C_1'$ is preferably 8% by mole or less, more preferably 6% by mole or less, and particularly preferably 3% by mole or less.

A smaller thickness of the solid electrolyte sheet is more preferred because the distance taken to conduct ions in the solid electrolyte becomes shorter to increase the ionic conductivity. Furthermore, with the use of the solid electrolyte sheet as a solid electrolyte for an all-solid-state battery, the all-solid-state battery has a higher energy density per unit volume. Specifically, the thickness of the solid electrolyte sheet according to the second aspect of the present invention is preferably 500 µm or less, more preferably 400 µm or less, still more preferably 300 µm or less, and particularly preferably 200 µm or less. However, if the thickness of the solid electrolyte sheet is too small, the mechanical strength may decrease and the positive and negative electrodes may be short-circuited. Therefore, the thickness is preferably not less than 5 µm, more preferably not less than 10 µm, still more preferably not less than 20 µm, yet still more preferably not less than 30 µm, and particularly preferably not less than 50 µm.

As the solid electrolyte sheet is thinner, the difference in $Na_2O$ concentration between the surface layer and the inside of the sheet during firing of a green sheet tends to increase. Therefore, when the solid electrolyte sheet is thin, the effect obtained by applying the production method according to the present invention can be more likely to be given. The reasons why as the solid electrolyte sheet is thinner, the difference in $Na_2O$ concentration between the surface layer and the inside of the sheet during firing of a green sheet tends to increase can be considered as follows. In the case where the solid electrolyte sheet is thick, a large amount of sodium component exists in the inside of the sheet. Therefore, even when the sodium component volatilizes from the sheet surface layer during firing of a green sheet, the sodium component is supplied to the surface layer and, therefore, the difference in $Na_2O$ concentration between the surface layer and the inside of the sheet is less likely to become large. On the other hand, in the case where the solid electrolyte sheet is thin, a small amount of sodium component exists in the inside of the sheet. Therefore, when the sodium component volatilizes from the sheet surface layer during firing of a green sheet, the sodium component is less likely to be supplied from the inside to the surface layer of the sheet and, therefore, the difference in $Na_2O$ concentration between the surface layer and the inside of the sheet is likely to become large.

The following description relates to the structure common to the solid electrolyte sheets according to the first and second aspects of the present invention, unless otherwise stated.

Specific examples of β"-alumina include the following trigonal crystals: $(Al_{10.35}Mg_{0.65}O_{16})$ $(Na_{1.65}O)$, $(Al_{8.87}Mg_{2.13}O_{16})$ $(Na_{3.13}O)$, $Na_{1.67}Mg_{0.67}Al_{10.33}O_{17}$, $Na_{1.49}Li_{0.25}Al_{10.75}O_{17}$, $Na_{1.72}Li_{0.3}Al_{10.66}O_{17}$, and $Na_{1.6}Li_{0.34}Al_{10.66}O_{17}$. The solid electrolyte sheet may contain, in addition to β"-alumina, β-alumina. Examples of β-alumina include the following hexagonal crystals: $(Al_{10.35}Mg_{0.65}O_{16})$ $(Na_{1.65}O)$, $(Al_{10.37}Mg_{0.63}O_{16})$ $(Na_{1.63}O)$, $NaAl_{11}O_{17}$, and $(Al_{10.32}Mg_{0.68}O_{16})$ $(Na_{1.68}O)$.

An example of a specific composition of the solid electrolyte sheet according to the present invention containing β"-alumina is a composition containing, in terms of % by mole, 65 to 98% $Al_2O_3$, 2 to 20% $Na_2O$, 0.3 to 15% $MgO+Li_2O$, 0 to 20% $ZrO_2$, and 0 to 5% $Y_2O_3$. Reasons why the composition is limited as just described will be described below.

$Al_2O_3$ is a main component that forms β"-alumina. The content of $Al_2O_3$ is preferably 65 to 98% and particularly preferably 70 to 95%. If $Al_2O_3$ is too less, the ionic conductivity of the solid electrolyte is likely to decrease. On the other hand, if $Al_2O_3$ is too much, α-alumina having no sodium-ion conductivity remains in the solid electrolyte, so that the ionic conductivity of the solid electrolyte is likely to decrease.

$Na_2O$ is a component that gives the solid electrolyte sodium-ion conductivity. The content of $Na_2O$ is preferably 2 to 20%, more preferably 3 to 18%, and particularly preferably 4 to 16%. If $Na_2O$ is too less, the above effect is less likely to be achieved. On the other hand, if $Na_2O$ is too much, surplus sodium forms compounds not contributing to ionic conductivity, such as $NaAlO_2$, so that the ionic conductivity is likely to decrease.

MgO and $Li_2O$ are components (stabilizing agents) that stabilize the structure of β"-alumina. The content of $MgO+Li_2O$ is preferably 0.3 to 15%, more preferably 0.5 to 10%, and particularly preferably 0.8 to 8%. If $MgO+Li_2O$ is too less, α-alumina remains in the solid electrolyte, so that the ionic conductivity is likely to decrease. On the other hand, if $MgO+Li_2O$ is too much, MgO or $Li_2O$ having failed to function as a stabilizing agent remains in the solid electrolyte, so that the ionic conductivity is likely to decrease.

$ZrO_2$ and $Y_2O_3$ have the effect of inhibiting abnormal grain growth of β"-alumina during firing to increase the adhesion of particles of β"-alumina. As a result, the ionic conductivity of the solid electrolyte sheet is likely to increase. In relation to the solid electrolyte sheet according to the second aspect, when the adhesion between particles of β"-alumina increases, the sodium component is less likely to volatilize from the surface of a green sheet during firing of the green sheet, so that the $Na_2O$ concentration in the surface layer of the solid electrolyte sheet can be increased. The content of $ZrO_2$ is preferably 0 to 15%, more preferably 1 to 13%, and particularly preferably 2 to 10%. The content of $Y_2O_3$ is preferably 0 to 5%, more preferably 0.01 to 4%, and particularly preferably 0.02 to 3%. If $ZrO_2$ or $Y_2O_3$ is too much, the amount of β"-alumina produced decreases, so that the ionic conductivity of the solid electrolyte is likely to decrease.

The NASICON crystals are preferably made of a compound represented by a general formula $Na_sAl_tA2_uO_v$ (where A1 is at least one selected from Al, Y, Yb, Nd, Nb, Ti, Hf, and Zr, A2 is at least one selected from Si and P, s=1.4 to 5.2, t=1 to 2.9, u=2.8 to 4.1, and v=9 to 14). In this relation, A1 is preferably at least one selected from Y, Nb, Ti, and Zr. By doing so, crystals having excellent ionic conductivity can be obtained.

The respective preferred ranges of the indices in the above general formula are as follows.

The index s is preferably 1.4 to 5.2, more preferably 2.5 to 3.5, and particularly preferably 2.8 to 3.1. If s is too small, the amount of sodium ions is small, so that the ionic conductivity is likely to decrease. On the other hand, if s is too large, surplus sodium forms compounds not contributing to ionic conductivity, such as sodium phosphate and sodium silicate, so that the ionic conductivity is likely to decrease.

The index t is preferably 1 to 2.9, more preferably 1 to 2.5, and particularly preferably 1.3 to 2. If t is too small, the three-dimensional network in crystals reduces, so that the ionic conductivity is likely to decrease. On the other hand, if t is too large, compounds not contributing to ionic conductivity, such as zirconia and alumina, are formed, so that the ionic conductivity is likely to decrease.

The index u is preferably 2.8 to 4.1, more preferably 2.8 to 4, still more preferably 2.9 to 3.2, and particularly preferably 2.95 to 3.1. If u is too small, the three-dimensional network in crystals reduces, so that the ionic conductivity is likely to decrease. On the other hand, if u is too large, crystals not contributing to ionic conductivity are formed, so that the ionic conductivity is likely to decrease.

The index v is preferably 9 to 14, more preferably 9.5 to 12, and particularly preferably 11 to 12. If v is too small, A1 (for example, an aluminum component) has a low valence, so that the electric insulation property is likely to decrease. On the other hand, if v is too large, a peroxidative state occurs, so that sodium ions are attracted by lonepairs of electrons of oxygen atoms and, therefore, the ionic conductivity is likely to decrease.

The above-described NASICON crystals are preferably monoclinic crystals, hexagonal crystals or trigonal crystals, and particularly preferably monoclinic or trigonal because they have excellent ionic conductivity.

Specific examples of the NASICON crystal include the following crystals: $Na_3Zr_2Si_2PO_{12}$, $Na_{3.2}Zr_{1.3}Si_{2.2}P_{0.8}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_2O_9$, $Na_3Zr_{1.88}Y_{0.12}Si_2PO_{12}$, $Na_{3.12}Zr_{1.88}Y_{0.12}Si_2PO_{12}$, $Na_{3.6}Zr_{0.13}Yb_{1.67}Si_{0.11}P_{2.9}O_{12}$, and $Na_5YSi_4O_{12}$. Particularly, $Na_{3.12}Zr_{1.88}Y_{0.12}Si_2PO_{12}$ is preferred because it has excellent ionic conductivity.

Next, a description will be given of a method for manufacturing the solid electrolyte sheets according to the first and second aspects of the present invention. The solid electrolyte sheets according to the first and second aspects of the present invention can be produced by a method including the steps of: (a) pre-firing a raw material powder; (b) making the pre-fired raw material powder into a slurry; (c) applying the slurry on a support and drying the slurry to obtain a green sheet; and (d) firing the green sheet to form sodium ion-conductive crystals.

In the case where the solid electrolyte sheet contains β"-alumina, the raw material powder contains $Al_2O_3$ as a main component. Specifically, the raw material powder preferably contains, in terms of % by mole, 65 to 98% $Al_2O_3$, 2 to 20% $Na_2O$, 0.3 to 15% $MgO+Li_2O$, 0 to 20% $ZrO_2$, and 0 to 5% $Y_2O_3$. Because reasons why the composition is limited as just described are as described previously, further explanation will be omitted.

In the case where the solid electrolyte sheet contains NASICON crystals, the raw material powder preferably contains, in terms of % by mole, 17.5 to 50% $Na_2O$, 12 to 45% $Al_2O_3+Y_2O_3+Yb_2O_3+Nd_2O_3+Nb_2O_5+TiO_2+HfO_2+ZrO_2$, and 24 to 54% $SiO_2+P_2O_5$. When the composition is limited as above, desired NASICON crystals can be precipitated.

The average particle diameter ($D_{50}$) of the raw material powder is preferably 10 μm or less. If the average particle diameter of the raw material powder is too large, the contact area between the raw material powder particles decreases, so that a solid-phase reaction is less likely to sufficiently progress. Furthermore, the solid electrolyte sheet tends to be difficult to reduce in thickness. The lower limit of the average particle diameter of the raw material powder is not particularly limited, but it is, actually, not less than 0.1 μm.

In producing the solid electrolyte sheet according to the first aspect, the raw material powder for the solid electrolyte sheet is pre-fired to produce a composite oxide (for example, β-alumina) as a precursor and the composite oxide is converted to sodium ion-conductive crystals by later firing (for example, β-alumina is changed in phase to β"-alumina). Thus, the contraction during the firing can be reduced and the deterioration in flatness of the solid electrolyte sheet can be therefore reduced. Furthermore, when the raw material powder is previously pre-fired, the release of carbon dioxide from a carbonate raw material and the volatilization of a sodium component and so on during the later firing can be reduced, so that the volume contraction of the green sheet can be reduced and the deterioration in flatness of the solid electrolyte sheet and the formation of cracks in the solid electrolyte sheet can be therefore reduced.

In producing the solid electrolyte sheet according to the second aspect, the raw material powder is pre-fired to produce a composite oxide (for example, β-alumina) as a precursor and the composite oxide is converted to sodium ion-conductive crystals by later firing (for example, β-alumina is changed in phase to β"-alumina). By doing so, the volatilization of a sodium component and so on during the firing can be reduced and, for the above-described reason, the ionic conductivity of the solid electrolyte sheet can be increased. Furthermore, since the release of carbon dioxide from a carbonate raw material is caused by the pre-firing, the release of carbon dioxide during the firing is reduced, so that a dense sheet can be produced.

In the case where the solid electrolyte sheet contains β"-alumina, the pre-firing temperature is preferably 1000° C. to below 1400° C., more preferably 1100 to 1350° C., and particularly preferably 1200 to 1300° C. In the case where the solid electrolyte sheet contains NASICON crystals, the pre-firing temperature is preferably 900° C. to below 1200° C., more preferably 1000 to 1180° C., and particularly preferably 1050 to 1160° C. If the pre-firing temperature is too low, the above effects are less likely to be achieved. On the other hand, if the pre-firing temperature is too high, the sheet is less likely to be sintered during later firing, so that the resultant solid electrolyte sheet is less likely to become dense.

The pre-firing time is appropriately adjusted so that the above effects can be achieved. Specifically, the pre-firing time is preferably 1 to 20 hours, more preferably 2 to 18 hours, still more preferably 2 to 15 hours, yet still more preferably 2 to 10 hours, and particularly preferably 3 to 8 hours. If the raw material powder is agglomerated by the pre-firing, the agglomerates are preferably ground so that the raw material powder has a desired particle diameter.

By the pre-firing, β"-alumina may be produced in addition to β-alumina. Alternatively, a composite oxide other than the above may be produced. Examples of such a composite oxide include those as described below.

Examples of a hexagonal composite oxide include $NaAl_5O_8$, $NaAl_7O_{11}$, $NaAl_{5.9}O_{9.4}$, $Na_2Al_{22}O_{34}$, $Na_{2.58}Al_{21.81}O_{34}$, $NaAl_{23}O_{35}$, $Na_2Al_{22}O_{33}$, $Na_{1.5}Al_{10.83}O_{17}$, $Na_{1.22}Al_{11}O_{17.11}$, $Na_{2.74}Al_{22}O_{38}$, $Na_2Li_{0.35}Al_{12.2}O_{19.475}$, $Na_{0.45}Li_{0.57}Al_{11}O_{17}$, $Na_{0.47}Li_{0.75}Al_{11}O_{17.11}$, $NaMg_2Al_{15}O_{25}$, $Na_2MgAl_{10}O_{17}$, $Na_2Mg_4Al_{30}O_{50}$, and $Na_{0.47}Mg_{0.75}Al_{11}O_{17.11}$.

Examples of a trigonal composite oxide include $Na_{1.77}Al_{11}O_{17}$, $Na_{1.71}Al_{11}O_{17}$, and $Na_2MgAl_{10}O_{17}$.

An example of a tetragonal composite oxide is $Na_2Al_2O_4$.

An example of a cubic composite oxide is $Na_2Al_2O_4$.

Examples of an orthorhombic composite oxide include $NaA_6O_{9.5}$, $Na_{0.67}Al_6O_{9.33}$, and $Na_5AlO_4$.

Examples of a monoclinic composite oxide include $Na_{17}Al_5O_{16}$ and $Na_{14}Al_4O_{13}$.

An example of a triclinic composite oxide is $Na_7Al_3O_8$.

In the case where the solid electrolyte sheet contains NASICON crystals, examples of a composite oxide as its precursor include those as described below.

Examples of a cubic composite oxide include $Na_2ZrO_3$, $(ZrO_2)_{0.92}(Na_2O)_{0.04}$, $(ZrO_2)_{0.95}(Na_2O)_{0.025}$, and $Na_{2.47}Zr_{0.13}PO_4$.

An example of a hexagonal composite oxide is $Na_2ZrO_3$.

Examples of a monoclinic composite oxide include $Na_6Si_8O_{19}$, $Na_6Si_2O_7$, $Na_6Si_8O_{19}$, $Na_2Si_3O_7$, $Na_2Si(Si_3O_9)$, $Na_2ZrO_3$, and $NaZr_5(PO_4)_7$.

Examples of an orthorhombic composite oxide include $(NaPO_3)_4$, $Na_3P_3O_9$, $Na_2Si_4O_9$, and $Na_{14}Zr_2Si_{10}O_{31}$.

An example of a triclinic composite oxide is $Na_4SiO_4$.

Examples of a trigonal composite oxide include $Na_{1.3}Zr_{1.832}(PO_4)_3$, $Na_8Si(Si_6O_{18})$, $NaZr_2(PO_4)_3$, $Na_5Zr(PO_4)_3$, and $NaZr_{1.88}(PO_4)_3$.

Other composite oxides include $Na_4P_2O_7$, $Na(PO_3)_3$, $NaPO_3$, $Na_3PO_4$, $Na_5P_3O_{10}$, $Na_4P_2O_7$, $(NaPO_3)_6$, $Na_4P_2O_6$, $Na_2SiO_3$, $Na_2Si_4O_9$, $Na_2Si_3O_7$, $Na_2Si_2O_5$, $Na_2ZrSiO_5$, $Na_{14}Zr_2Si_{10}O_{31}$, and $Na_{2.8}Zr_{6.5}Si_2O_{17.8}$.

A binder, a plasticizer, a solvent, and so on are added to the pre-fired raw material powder and the mixture is kneaded into a slurry.

The solvent may be water or an organic solvent, such as ethanol or acetone. However, when water is used as the solvent, a sodium component may elute off from the raw material powder to increase the pH of the slurry and agglomerate the raw material powder. Therefore, an organic solvent is preferably used.

Next, the obtained slurry is applied onto a support made of PET (polyethylene terephthalate) or so on and dried, thus obtaining a green sheet. The application of the slurry can be implemented with a doctor blade, a die coater or other means. The thickness of the green sheet is preferably 0.01 to 1 mm, more preferably 0.02 to 1 mm, and particularly preferably 0.05 to 0.9 mm. If the thickness of the green sheet is too small, the mechanical strength of the resultant solid electrolyte sheet may decrease or the positive and negative electrodes may be short-circuited. On the other hand, if the thickness of the green sheet is too large, the thickness of the resultant solid electrolyte sheet becomes large to increase the distance taken to conduct ions in the solid electrolyte sheet and make the energy density per unit cell likely to decrease.

Then, the green sheet is fired to produce β"-alumina, thus obtaining a solid electrolyte sheet. Specifically, by the firing, β-alumina is changed in phase to β"-alumina having excellent ionic conductivity. Alternatively, the green sheet is fired to produce NASICON crystals, thus obtaining a solid electrolyte sheet.

In the case where the solid electrolyte sheet contains β"-alumina, the firing temperature is preferably 1400° C. or higher, more preferably 1450° C. or higher, and particularly preferably 1500° C. or higher. If the firing temperature is too low, the sintering of particles of β"-alumina in the solid electrolyte sheet becomes insufficient, so that a dense sheet is less likely to be provided and the ionic conductivity is therefore likely to decrease. Furthermore, the phase change from β-alumina to β"-alumina is less likely to occur, so that the ionic conductivity is likely to decrease. On the other hand, the upper limit of the firing temperature is preferably not higher than 1750° C. and particularly not higher than 1700° C. If the firing temperature is too high, the amount of evaporation of sodium component or the like becomes large, so that other crystals tend to precipitate and the denseness tends to decrease. As a result, the ionic conductivity of the solid electrolyte sheet is likely to decrease. The firing time is appropriately adjusted so that produced β"-alumina can be sufficiently sintered. Specifically, the firing time is preferably 10 to 120 minutes and particularly preferably 20 to 80 minutes.

In the case where the solid electrolyte sheet contains NASICON crystals, the firing temperature is preferably 1200° C. or higher and particularly preferably 1210° C. or higher. If the firing temperature is too low, a dense solid electrolyte sheet is less likely to be provided and the ionic conductivity is therefore likely to decrease. Furthermore, NASICON crystals are less likely to precipitate, so that the ionic conductivity is likely to decrease. On the other hand, the upper limit of the firing temperature is preferably not higher than 1400° C. and particularly not higher than 1300° C. If the firing temperature is too high, the amount of evaporation of sodium component or the like becomes large, so that other crystals tend to precipitate and the denseness tends to decrease. As a result, the ionic conductivity of the solid electrolyte sheet is likely to decrease. The firing time is appropriately adjusted so that a dense sintered body can be obtained.

When the green sheet is subjected to pressing, such as isostatic pressing, before being fired, the adhesion of particles of β"-alumina or NASICON crystals in the solid electrolyte sheet after being fired increases, so that the ionic conductivity is likely to increase. In the production of a solid electrolyte sheet according to the second aspect, when the adhesion between particles of β"-alumina increases, the sodium component is less likely to volatilize from the surface of the green sheet during firing of the green sheet, so that the $Na_2O$ concentration in the surface layer of the solid electrolyte sheet can be increased.

The firing is preferably performed with the green sheet placed on an MgO setter. By doing so, the reaction of the raw material powder with the setter during firing of the green sheet can be reduced. As a result, for example, in producing a solid electrolyte sheet according to the second aspect, the effect of reducing the decrease in $Na_2O$ concentration in the surface layer of the solid electrolyte sheet can be obtained. This effect is likely to be obtained particularly in producing a solid electrolyte sheet containing β"-alumina.

Furthermore, the firing is preferably performed in a state where the green sheet is placed between an upper setter and a lower setter and a clearance is provided between the green sheet and the upper setter. By doing so, the deterioration in flatness and the formation of cracks due to contraction of the green sheet during firing can be further reduced. The clearance between the green sheet and the upper setter is preferably 1 to 500 µm, more preferably 2 to 400 µm, and particularly preferably 5 to 300 µm. If the clearance is too small, the above effects are less likely to be achieved. On the other hand, if the clearance is too large, undulation due to contraction of the green sheet during firing occurs, so that the value of flatness of the solid electrolyte sheet tends to be large.

The solid electrolyte sheet according to the present invention is suitable for use in a sodium ion all-solid-state secondary battery. The sodium ion all-solid-state secondary battery is made up by including a positive electrode layer formed on one surface of the solid electrolyte sheet according to the present invention and a negative electrode layer formed on the other surface of the solid electrolyte sheet. The positive electrode layer and the negative electrode layer each contain an active material. The active material acts as a positive-electrode active material or a negative-electrode active material and can absorb and release sodium ions during charge and discharge.

Examples of the positive-electrode active material include: layered sodium transition metal oxide crystals, such as $NaCrO_2$, $Na_{0.7}MnO_2$, and $NaFe_{0.2}Mn_{0.4}Ni_{0.4}O_2$; sodium transition metal phosphate crystals containing Na, M (where M represents at least one transition metal element selected from Cr, Fe, Mn, Co, and Ni), P, and O, such as $Na_2FeP_2O_7$, $NaFePO_4$, and $Na_3V_2(PO_4)_3$; and like active material crystals.

Particularly, the crystals containing Na, M, P, and O are preferred because they have high capacity and excellent chemical stability. Preferred among them are triclinic crystals belonging to space group P1 or P-1 and particularly preferred are crystals represented by a general formula $Na_xMyP_2O_7$ (where $1.20 \leq x \leq 2.80$ and $0.95 \leq y \leq 1.60$), because these crystals have excellent cycle characteristics.

Examples of the negative-electrode active material include: crystals containing at least one selected from Nb and Ti and O, metallic crystals of at least one selected from Sn, Bi, and Sb; and other active material crystals.

The crystals containing at least one selected from Nb and Ti, and O are preferred because they have excellent cycle characteristics. If the crystal containing at least one selected from Nb and Ti and O further contains Na and/or Li, this is preferred because the charge/discharge efficiency (the proportion of discharge capacity to charge capacity) increases and a high charge/discharge capacity can be thus maintained. Above all, if the crystal containing at least one selected from Nb and Ti and O is an orthorhombic, hexagonal, cubic or monoclinic crystal, particularly a monoclinic crystal belonging to space group P21/m, this is preferred because a capacity decrease is less likely to occur even during charge and discharge at a large current. An example of the orthorhombic crystal is $NaTi_2O_4$, examples of the hexagonal crystal include $Na_2TiO_3$, $NaTi_8O_{13}$, $NaTiO_2$, $LiNbO_3$, $LiNbO_2$, $Li_7NbO_6$, $LiNbO_2$, and $Li_2Ti_3O_7$, examples of the cubic crystal include $Na_2TiO_3$, $NaNbO_3$, $Li_4Ti_5O_{12}$, and $Li_3NbO_4$, examples of the monoclinic crystal include $Na_2Ti_6O_{13}$, $NaTi_2O_4$, $Na_2TiO_3$, $Na_4Ti_5O_{12}$, $Na_2Ti_4O_9$, $Na_2Ti_9O_{19}$, $Na_2Ti_3O_7$, $Na_2Ti_3O_7$, $Li_{1.7}Nb_2O_5$, $Li_{1.9}Nb_2O_5$, $Li_{12}Nb_{13}O_{33}$, and $LiNb_3O_8$, and an example of the monoclinic crystal belonging to space group P21/m is $Na_2Ti_3O_7$.

The crystal containing at least one selected from Nb and Ti and O preferably further contains at least one selected from B, Si, P, and Ge. These components have the effect of facilitating the formation of an amorphous phase together with the active material crystals and increasing the sodium-ion conductivity.

Other negative-electrode active materials that can be used include metallic crystals of at least one selected from Sn, Bi, and Sb and glasses containing at least one selected from Sn, Bi, and Sb. These materials are preferred because they have high capacity and they are less likely to cause a capacity decrease even during charge and discharge at a large current.

The positive electrode layer and the negative electrode layer may be electrode composite layers made of a composite of an active material and a solid electrolyte. The solid electrolyte acts as a sodium ion-conducting path in the electrode composite and can therefore increase the discharge capacity and voltage of the battery.

The solid electrolyte that can be used is one obtained by processing the above-described solid electrolyte sheet into powdered form.

The positive electrode layer and the negative electrode layer preferably further contain a conductive agent. The conductive agent is a component to be added to the electrode layer in order to achieve a capacity increase and high-rate charge and discharge of the electrode. Specific examples of the conductive agent include highly electrically conductive carbon blacks, such as acetylene black and Ketjenblack, graphite, coke, and metal powders, such as Ni powder, Cu powder, and Ag powder. Among them, any of highly electrically conductive carbon blacks, Ni powder, and Cu powder is preferably used, which exhibit excellent electrical conductivity even when added in very small amount.

EXAMPLES

Hereinafter, a description will be given in detail of the present invention with reference to its examples, but the present invention is not limited to these examples.

Solid Electrolyte Sheet According to First Aspect

Figure 2:
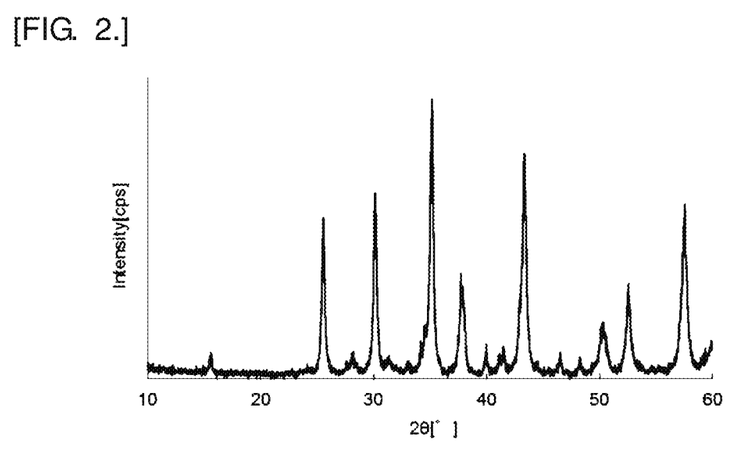
FIG. 2 is a graph showing, in an example of a solid electrolyte sheet according to a first aspect, a powder X-ray diffraction pattern of a raw material powder of the solid electrolyte sheet.
Figure 3:
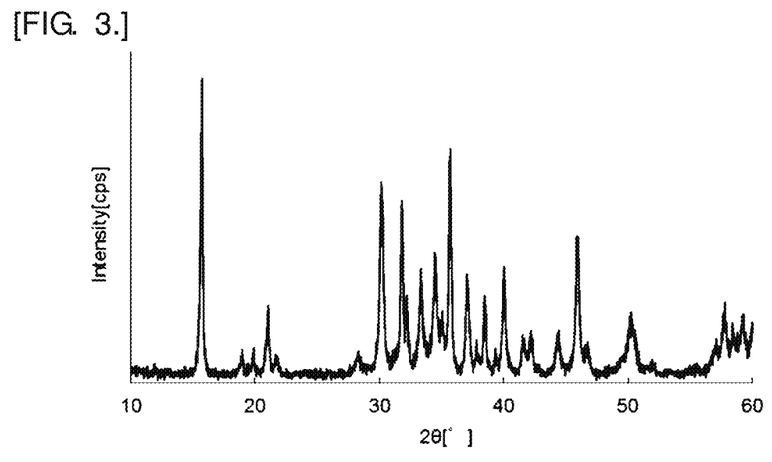
FIG. 3 is a graph showing, in the example of the solid electrolyte sheet according to the first aspect, a powder X-ray diffraction pattern of the raw material powder after being pre-fired.

Table 1 shows Examples 1 to 6 and Table 2 shows Comparative Examples 1 to 5.

and yttrium oxide ($Y_2O_3$) as raw materials, a raw material powder was prepared to have a composition of, in terms of % by mole, 14.2% $Na_2O$, 75.4% $Al_2O_3$, 5.4% MgO, 4.9% $ZrO_2$, and 0.1% $Y_2O_3$. FIG. 2 shows a powder X-ray diffraction pattern of the raw material powder. The powder X-ray diffraction pattern was measured using an X-ray diffractometer (RINT-2000 manufactured by Rigaku Corporation). In Examples 1 to 3 and 5, a powder obtained by pre-firing the raw material powder at 1250° C. for four hours, then grinding it, and classifying the ground product was used for the preparation of a slurry. When the powder X-ray diffraction pattern of the raw material powder after being pre-fired was checked, diffraction lines originating from a hexagonal crystal ($\beta$-alumina, i.e., ($Al_{10.35}Mg_{0.65}O_{16}$) ($Na_{1.65}O$)) belonging to space group P63 and diffraction lines originating from a trigonal crystal ($\beta''$-alumina, i.e., ($Al_{10.35}Mg_{0.65}O_{16}$)($Na_{1.65}O$)) belonging to space group R-3m were confirmed. FIG. 3 shows a powder X-ray diffraction pattern of the pre-fired raw material powder. Furthermore, the rate of change to $\beta''$ determined from the X-ray diffraction pattern was 54%. The rate of change to $\beta''$ was determined in the following manner.

Rate of Change to $\beta''=I\beta''/(I\beta+I\beta'')\times100\%$ $I\beta$: peak intensity of $\beta$-alumina phase $I\beta''$: peak intensity of $\beta''$-alumina phase The peak intensity $I\beta$ used was a value of 4.5 times the intensity of the (1, 0, 7) plane of the $\beta$-alumina phase and the peak intensity $I\beta''$ used was a value of 4.2 times the peak intensity of the (0, 2, 10) plane of the $\beta''$-alumina phase. In Comparative Examples 1, 2, and 4, the raw material powder was used as it was, without pre-firing, for the preparation of

TABLE 1

|  | Ex. 1 | Ex. 2 | Ex. 3 | Ex. 4 | Ex. 5 | Ex. 6 |
| --- | --- | --- | --- | --- | --- | --- |
| Pre-firing of Raw Material Powder | done | done | done | done | done | done |
| Solid Electrolyte Sheet | A | A | A | B | A | B |
| Solid Electrolyte Sheet Thickness [μm] | 64 | 114 | 192 | 68 | 71 | 70 |
| Solid Electrolyte Sheet Flatness [μm] | 18 | 52 | 148 | 23 | 23 | 27 |
| Solid Electrolyte Powder | A | A | A | A | B | B |
| Average Voltage [V] | 2.8 | 2.8 | 2.7 | 2.6 | 2.6 | 2.5 |
| Discharge Capacity [mAh/g] | 73 | 71 | 70 | 65 | 68 | 61 |
| Rapid Charge/Discharge Char. [%] | 82 | 77 | 69 | 73 | 75 | 64 |
| Volume Energy Density [mWh/cm³] | 82.3 | 57.1 | 37.4 | 65.9 | 67.4 | 46.9 |

TABLE 2

|  | Comp. Ex. 1 | Comp. Ex. 2 | Comp. Ex. 3 | Comp. Ex. 4 | Comp. Ex. 5 |
| --- | --- | --- | --- | --- | --- |
| Pre-firing of Raw Material Powder | no | no | no | no | no |
| Solid Electrolyte Sheet | A | A | B | A | B |
| Solid Electrolyte Sheet Thickness [μm] | 143 | 174 | 152 | 141 | 131 |
| Solid Electrolyte Sheet Flatness [μm] | 267 | 487 | 312 | 286 | 277 |
| Solid Electrolyte Powder | A | A | A | B | B |
| Average Voltage [V] | 2.5 | — | 2.3 | 2.4 | 2.1 |
| Discharge Capacity [mAh/g] | 52 | — | 41 | 49 | 38 |
| Rapid Charge/Discharge Char. [%] | 46 | — | 39 | 42 | 35 |
| Volume Energy Density [mWh/cm³] | 32.0 | — | 22.2 | 29.2 | 16.7 |

(a-1) Production of Solid Electrolyte Sheet a (Preparation of Slurry)

Using sodium carbonate ($Na_2CO_3$), aluminum oxide ($Al_2O_3$), magnesium oxide (MgO), zirconium oxide ($ZrO_2$), a slurry. Next, the powdered raw materials were wet mixed for four hours using ethanol as a medium. After ethanol was evaporated from the mixture, an acrylic acid ester-based copolymer (OLYCOX 1700 manufactured by Kyoeisha Chemical Co., Ltd.) as a binder and benzyl butyl phthalate as a plasticizer were used and weighed with the mixture to reach a ratio of powdered raw materials to binder to plasticizer of 83.5:15:1.5 (mass ratio) and the mixture was dispersed into N-methylpyrrolidinone, followed by well stirring with a planetary centrifugal mixer to form a slurry.

(Preparation of Green Sheet)

The slurry obtained as above was applied onto a PET film using a doctor blade and dried at 70° C., thus obtaining a green sheet.

(Pressing and Firing of Green Sheet)

Figure 4:
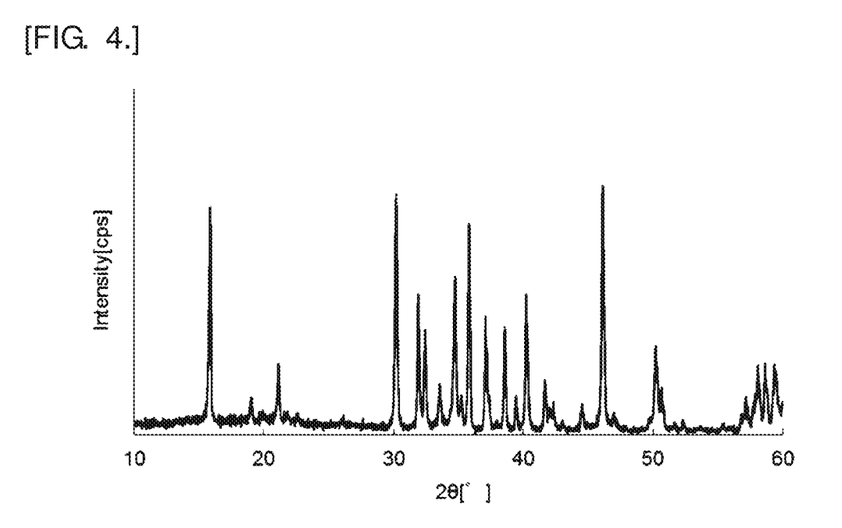
FIG. 4 is a graph showing, in the example of the solid electrolyte sheet according to the first aspect, a powder x-ray diffraction pattern of the obtained solid electrolyte sheet.

The obtained green sheet was cut into 15-mm squares and pressed at 90° C. and 40 MPa for five minutes using an isostatic pressing apparatus. The pressed green sheet was placed between an upper setter and a lower setter (both formed of a MgO sheet), a 10 μm clearance was provided between the green sheet and the upper setter, and the green sheet in this state was fired at 1600° C. for 30 minutes, thus obtaining a solid electrolyte sheet A. When the powder X-ray diffraction pattern of the solid electrolyte sheet A was checked, diffraction lines originating from a hexagonal crystal (β-alumina, i.e., $(Al_{10.35}Mg_{0.65}O_{16})$ $(Na_{1.65}O)$) belonging to space group P63 and diffraction lines originating from a trigonal crystal (β"-alumina, i.e., $(Al_{10.35}Mg_{0.65}O_{16})$ $(Na_{1.65}O)$) belonging to space group R-3m were confirmed. FIG. 4 shows a powder X-ray diffraction pattern of the solid electrolyte sheet A. The rate of change to β" determined from the X-ray diffraction pattern was 82%.

(a-2) Production of Solid Electrolyte Sheet B (Preparation of Slurry)

Using sodium carbonate ($Na_2CO_3$), yttria-stabilized zirconia ($(ZrO_2)_{0.97}(Y_2O_3)_{0.03}$), silicon dioxide ($SiO_2$), and sodium metaphosphate ($NaPO_3$), a raw material powder was formulated to have a composition of, in terms of % by mole, 25.3% $Na_2O$, 31.6% $ZrO_2$, 1% $Y_2O_3$, 33.7% $SiO_2$, and 8.4% $P_2O_5$. In Examples 4 and 6, a powder obtained by pre-firing the raw material powder at 1100° C. for eight hours, then grinding it, and classifying the ground product was used. In Comparative Examples 3 and 5, the raw material powder was used as it was, without pre-firing. Next, the powdered raw materials were wet mixed for four hours using ethanol as a medium. After ethanol was evaporated from the mixture, an acrylic acid ester-based copolymer (OLYCOX 1700 manufactured by Kyoeisha Chemical Co., Ltd.) as a binder and benzyl butyl phthalate as a plasticizer were used and weighed with the mixture to reach a ratio of powdered raw materials to binder to plasticizer of 83.5:15:1.5 (mass ratio) and the mixture was dispersed into N-methylpyrrolidinone, followed by well stirring with a planetary centrifugal mixer to form a slurry.

(Preparation of Green Sheet)

The slurry obtained as above was applied onto a PET film using a doctor blade and dried at 70° C., thus obtaining a green sheet.

(Pressing and Firing of Green Sheet)

The obtained green sheet was cut into 15-mm squares and pressed at 90° C. and 40 MPa for five minutes using an isostatic pressing apparatus. The pressed green sheet was placed between an upper setter and a lower setter (both formed of a Pt sheet), a 10 μm clearance was provided between the green sheet and the upper setter, and the green sheet in this state was fired at 1220° C. for 40 hours, thus obtaining a solid electrolyte sheet B. When the powder X-ray diffraction pattern of the solid electrolyte sheet B was checked, NASICON crystals were confirmed.

(b) Measurement of Flatness

The surface shape within a 10-mm square central portion of the obtained solid electrolyte sheet was measured with SURFCORDER ET4000AK (manufactured by Kosaka Laboratory Ltd.) under the conditions below. The difference between the maximum and minimum values of the height obtained by the measurement was defined as a flatness.

X-direction measurement length: 10 mm
X-direction feed speed: 0.1 mm/s
Y-direction feed pitch: 200 μm
Number of Y-direction lines: 51

(c) Production of Sodium Ion all-Solid-State Secondary Battery (c-1) Preparation of Precursor Powder of Positive-Electrode Active Material Crystals Using sodium metaphosphate ($NaPO_3$), ferric oxide ($Fe_2O_3$), and orthophosphoric acid ($H_3PO_4$) as raw materials, a raw material powder was formulated to have a composition of, in % by mole, 40% $Na_2O$, 20% $Fe_2O_3$, and 40% $P_2O_5$. The raw material powder was melted in an air atmosphere at 1250° C. for 45 minutes. Thereafter, the molten glass was poured between a pair of rolls and formed into a film with rapid cooling, thus preparing a precursor of positive-electrode active material crystals.

The obtained precursor of positive-electrode active material crystals was ground for five hours in a ball mill using 20-mm diameter $ZrO_2$ balls and the ground product was passed through a resin-made sieve with 120 μm openings to obtain a coarse glass powder having an average particle diameter of 3 to 15 μm. Next, the coarse glass powder was ground, using ethanol as a grinding aid, for 80 hours in a ball mill using 3-mm diameter $ZrO_2$ balls, thus obtaining a precursor powder of positive-electrode active material crystals having an average particle diameter of 0.7 μm.

To confirm precipitated active material crystals, 93% by mass precursor powder of positive-electrode active material crystals obtained as above and 7% by mass acetylene black (SUPER C65 manufactured by TIMCAL) were well mixed and the mixed powder was heat-treated at 450° C. for an hour in a mixed gas atmosphere of nitrogen and hydrogen (96% by volume nitrogen and 4% by volume hydrogen). When the powder X-ray diffraction pattern of the powder after being heat-treated was checked, diffraction lines originating from a triclinic crystal ($Na_2FeP_2O_7$) belonging to space group P-1 were confirmed.

(c-2) Preparation of Solid Electrolyte Powder A

Using sodium carbonate ($Na_2CO_3$), aluminum oxide ($Al_2O_3$), magnesium oxide (MgO), zirconium oxide ($ZrO_2$), and yttrium oxide ($Y_2O_3$) as raw materials, a raw material powder was formulated to have a composition of, in terms of % by mole, 14.2% $Na_2O$, 75.4% $Al_2O_3$, 5.4% MgO, 4.9% $ZrO_2$, and 0.1% $Y_2O_3$. The raw material powder was fired at 1250° C. for four hours in an air atmosphere. The fired powder was ground for 24 hours in a ball mill using 20-mm diameter $Al_2O_3$ balls. Thereafter, the powder was classified by air to obtain a powder having an average particle diameter D50 of 2.0 μm. The obtained powder was formed into a 30-mm diameter cylinder at a pressure of 11 MPa in a forming die, followed by heat treatment at 1600° C. for 30 minutes in an air atmosphere, thus obtaining sodium ion-conductive crystals (β"-alumina). The obtained sodium ion-conductive crystals were ground with an alumina pestle in an alumina mortar and the ground product was passed through a mesh with 300 μm openings. The obtained powder was further ground, in a planetary ball mill P6 manufactured by Fritsch GmbH and loaded with 5-mm diameter $ZrO_2$ balls, at 300 rpm for 30 minutes (with a 15-minute pause every 15 minutes), and then passed through a mesh with 20-μm openings. Thereafter, the powder was classified with an air classifier, thus obtaining a solid electrolyte powder A containing β"-alumina. The preparation of sodium ion-conductive crystals and the preparation of a sodium ion-conductive crystal powder were conducted in an environment of the dew point minus 40° C. or lower.

(c-3) Preparation of Solid Electrolyte Powder B

Using sodium carbonate ($Na_2CO_3$), yttria-stabilized zirconia ($(ZrO_2)_{0.97}(Y_2O_3)_{0.03}$), silicon dioxide ($SiO_2$), and sodium metaphosphate ($NaPO_3$), a raw material powder was formulated to have a composition of, in terms of % by mole, 25.3% $Na_2O$, 31.6% $ZrO_2$, 1% $Y_2O_3$, 33.7% $SiO_2$, and 8.4% $P_2O_5$. Next, the powdered raw materials were wet mixed for four hours using ethanol as a medium. Thereafter, ethanol was evaporated, the powdered raw materials were pre-fired at 1100° C. for eight hours and then ground, and the ground powder was classified with an air classifier (type MDS-3 manufactured by Nippon Pneumatic Mfg. Co., Ltd.). The classified powder was uniaxially pressed into shape at 11 MPa in a 30-mm diameter die and then heat-treated at 1220° C. for 40 hours to obtain a solid electrolyte containing sodium ion-conductive crystals (NASICON crystals).

The obtained solid electrolyte was ground with an alumina pestle in an alumina mortar and the ground product was passed through a mesh with 300-μm openings. The obtained powder was further ground, in a planetary ball mill P6 manufactured by Fritsch GmbH and loaded with 5-mm diameter $ZrO_2$ balls, at 300 rpm for 30 minutes (with a 15-minute pause every 15 minutes), and then passed through a mesh with 20-μm openings. Thereafter, the powder was classified with an air classifier, thus obtaining a solid electrolyte powder B containing sodium ion-conductive crystals (NASICON crystals). The preparation of sodium ion-conductive crystals and the preparation of a sodium ion-conductive crystal powder were conducted in an environment of the dew point minus 40° C. or lower.

(c-4) Production of Test Cell

A precursor powder of positive-electrode active material crystals, a solid electrolyte powder A, and acetylene black (SUPER C65 manufactured by TIMCAL) were weighed to reach, in terms of % by mass, 72%, 25%, and 3%, respectively, and these powders were mixed for approximately 30 minutes with an agate pestle in an agate mortar. An amount of 20 parts by mass of N-methylpyrrolidinone containing 10% by mass polypropylene carbonate (manufactured by Sumitomo Seika Chemicals Co., Ltd.) was added to 100 parts by mass of the mixed powder and the mixture was stirred well with a planetary centrifugal mixer to form a slurry. All the above operations were conducted in an environment of the dew point minus 40° C. or lower.

A masking tape having a 10-mm square opening and a thickness of 100 μm was attached to the surface of each of the solid electrolyte sheets A having a thickness shown in Table 1 or 2 and the slurry was applied to the masking tape-attached solid electrolyte sheet A with a squeegee and then dried at 70° C. for three hours. Next, the slurry on the solid electrolyte sheet was fired at 450° C. for an hour in a mixed gas atmosphere of nitrogen and hydrogen (96% by volume nitrogen and 4% by volume hydrogen), thus forming a positive electrode layer on the one surface of the solid electrolyte sheet. When the X-ray diffraction pattern of the obtained positive electrode layer was checked, diffraction lines originating from a triclinic crystal ($Na_2FeP_2O_7$), which is an active material crystal and belongs to space group P-1, diffraction lines originating from a hexagonal crystal (β-alumina, i.e., ($Al_{10.35}Mg_{0.65}O_{16}$) ($Na_{1.65}O$)), which is a sodium ion-conductive crystal and belongs to space group P63, and diffraction lines originating from a trigonal crystal (β"-alumina, i.e., ($Al_{10.35}Mg_{0.65}O_{16}$)($Na_{1.65}O$)) belonging to space group R-3m were confirmed.

A current collector of a 300-nm thick gold electrode was formed on the surface of the positive electrode layer using a sputtering device (SC-701AT manufactured by Sanyu Electron Co., Ltd.). Thereafter, metallic sodium serving as a counter electrode was pressure-bonded to the other surface of the solid electrolyte sheet opposite to the surface thereof on which the positive electrode layer was formed, in an argon atmosphere of the dew point minus 60° C. or lower, and the obtained product was placed on a lower lid of a coin cell and covered with an upper lid to produce a CR2032-type test cell.

In Example 4 and Comparative Example 3, a test cell was produced in the same manner as described above except that the solid electrolyte sheet B having a thickness shown in Table 1 or 2 was used instead of the solid electrolyte sheet A. In Example 5 and Comparative Example 4, a test cell was produced in the same manner as described above except that the solid electrolyte powder B was used instead of the solid electrolyte powder A. In Example 6 and Comparative Example 5, a test cell was produced in the same manner as described above except that the solid electrolyte sheet B having a thickness shown in Table 1 or 2 was used instead of the solid electrolyte sheet A and the solid electrolyte powder B was used instead of the solid electrolyte powder A.

(c-5) Charge and Discharge Test

A charge and discharge test was conducted at 30° C. using each of the obtained test cells to measure the discharge capacity. The results are shown in Tables 1 and 2. In the charge and discharge test, charging (release of sodium ions from the positive-electrode active material) was implemented by CC (constant-current) charging from the open circuit voltage (OCV) to 4.3 V and discharging (absorption of sodium ions to the positive-electrode active material) was implemented by CC discharging from 4.3 V to 2 V. The C rate was 0.01 C.

The average voltage and discharge capacity in Tables 1 and 2 mean the first average voltage and first discharge capacity evaluated at a C rate of 0.01 C and the rapid charge/discharge characteristic in Tables 1 and 2 indicates the ratio of the first discharge capacity at a C rate of 0.1 C to the first discharge capacity at a C rate of 0.01 C ((0.1 C/0.01 C)×100 (o)).

Examples 1 to 6 exhibited an average voltage of 2.5 to 2.8 V, a discharge capacity of 61 to 73 mAh/g, a rapid charge/discharge characteristic of 64 to 82%, and an energy density of 37.4 to 82.3 $mWh/cm^3$, and were therefore excellent in these characteristics. On the other hand, Comparative Examples 1 and 3 to 5 exhibited an average voltage of 2.5 V or less, a discharge capacity of 52 mAh/g or less, a rapid charge/discharge characteristic of 46% or less, and an energy density of 32.0 $mWh/cm^3$ or less, and were therefore poor in these characteristics. In Comparative Example 2 in which the flatness of the solid electrolyte sheet was as significantly large as 487 μm, the solid electrolyte sheet was broken during production of a cell and, therefore, the cell characteristics could not be measured.

Solid Electrolyte Sheet According to Second Aspect

Table 3 shows Examples 1 to 6 and Table 4 shows Comparative Examples 1 to 5.

TABLE 3

| | Ex. 1 | Ex. 2 | Ex. 3 | Ex. 4 | Ex. 5 | Ex. 6 |
|---|---|---|---|---|---|---|
| Pre-firing | done | done | done | done | done | done |
| Solid Electrolyte Sheet | A | A | A | B | A | B |
| Solid Electrolyte Sheet Thickness [μm] | 67 | 103 | 448 | 54 | 62 | 74 |
| $Na_2O$ Concentration $C_1$ at Depth of 5 μm from Surface [% by mole] | 12.4 | 9.8 | 11.4 | 11.5 | 10.6 | 11.6 |

TABLE 3-continued

|  | Ex. 1 | Ex. 2 | Ex. 3 | Ex. 4 | Ex. 5 | Ex. 6 |
|---|---|---|---|---|---|---|
| $Na_2O$ Concentration $C_2$ at Depth of 20 μm from Surface [% by mole] | 12.8 | 11.2 | 12.1 | 12.4 | 11.9 | 12.1 |
| $C_2$—$C_1$ [% by mole] | 0.4 | 1.4 | 0.7 | 0.9 | 1.3 | 0.5 |
| $Na_2O$ Concentration $C_1'$ at Depth of 5% from Surface [% by mole] | 12.3 | 9.9 | 12.2 | 11.2 | 10.5 | 11.3 |
| $Na_2O$ Concentration $C_2'$ at Depth of 50% from Surface [% by mole] | 12.8 | 11.4 | 12.4 | 12.5 | 12.1 | 12.2 |
| $C_2'$—$C_1'$ [% by mole] | 0.5 | 1.5 | 0.2 | 1.3 | 1.6 | 0.9 |
| Solid Electrolyte Powder | A | A | A | A | B | B |
| Ionic Conductivity [×$10^{-3}$ S/cm] | 5.1 | 4.6 | 3.3 | 0.3 | 4.8 | 0.5 |
| Discharge Capacity [mAh/g] | 47 | 43 | 40 | 34 | 37 | 35 |
| Volume Energy Density [mWh/cm$^3$] | 63.5 | 45.3 | 13.5 | 33.3 | 33.9 | 29.2 |

TABLE 4

|  | Comp. Ex. 1 | Comp. Ex. 2 | Comp. Ex. 3 | Comp. Ex. 4 | Comp. Ex. 5 |
|---|---|---|---|---|---|
| Pre-firing | no | no | no | no | no |
| Solid Electrolyte Sheet | A | A | B | A | B |
| Solid Electrolyte Sheet Thickness [μm] | 73 | 59 | 63 | 71 | 65 |
| $Na_2O$ Concentration $C_1$ at Depth of 5 μm from Surface [% by mole] | 1.2 | 0.1 | 0.8 | 1.3 | 0.5 |
| $Na_2O$ Concentration $C_2$ at Depth of 20 μm from Surface [% by mole] | 12.7 | 11.3 | 12.4 | 11.9 | 11.2 |
| $C_2$—$C_1$ [% by mole] | 11.5 | 11.2 | 11.6 | 10.6 | 10.7 |
| $Na_2O$ Concentration $C_1'$ at Depth of 5% from Surface [% by mole] | 0.9 | 0.1 | 0.4 | 1.1 | 0.3 |
| $Na_2O$ Concentration $C_2'$ at Depth of 50% from Surface [% by mole] | 12.8 | 11.5 | 12.5 | 12.2 | 11.6 |
| $C_2'$—$C_1'$ [% by mole] | 11.9 | 11.4 | 12.1 | 11.1 | 11.3 |
| Solid Electrolyte Powder | A | A | A | B | B |
| Ionic Conductivity [×$10^{-3}$ S/cm] | 0.08 | 0.003 | 0.0004 | 0.007 | 0.0001 |
| Discharge Capacity [mAh/g] | 7 | 2 | 1 | 3 | 2 |
| Volume Energy Density [mWh/cm$^3$] | 9.0 | 2.9 | 0.9 | 2.6 | 1.8 |

(a-1) Production of Solid Electrolyte Sheet A (Preparation of Slurry)

Figure 5:
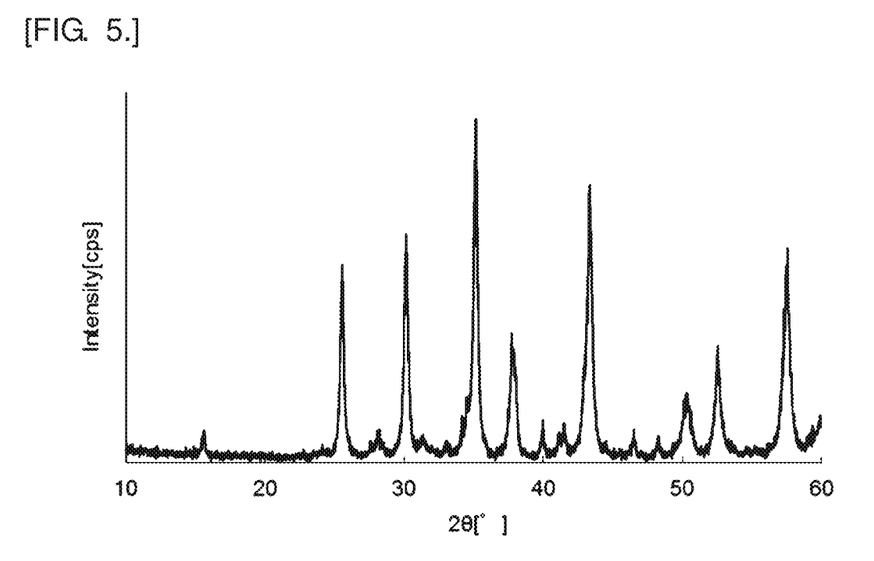
FIG. 5 is a graph showing, in an example of a solid electrolyte sheet according to a second aspect, a powder X-ray diffraction pattern of a raw material powder of the solid electrolyte sheet.
Figure 6:
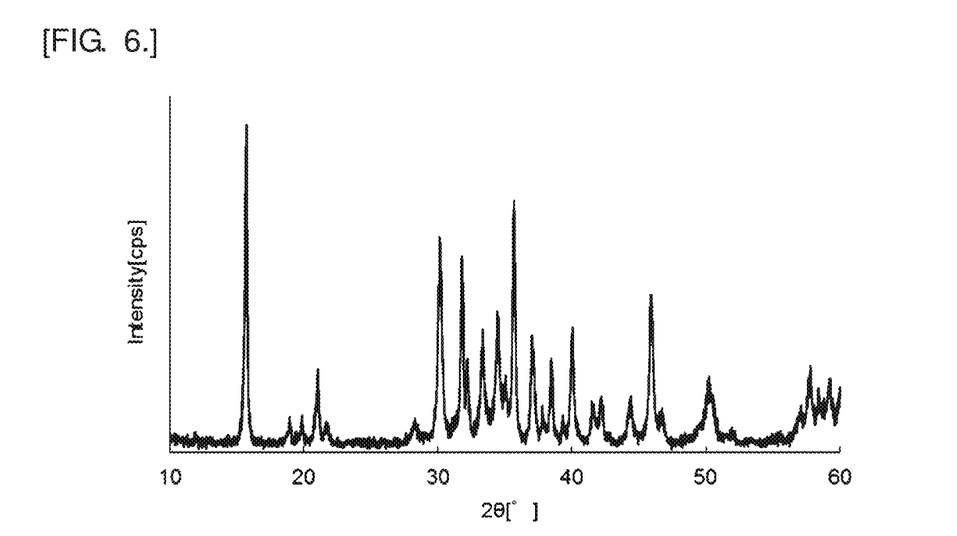
FIG. 6 is a graph showing, in the example of the solid electrolyte sheet according to the second aspect, a powder X-ray diffraction pattern of the raw material powder after being pre-fired.

Using sodium carbonate ($Na_2CO_3$), aluminum oxide ($Al_2O_3$), magnesium oxide (MgO), zirconium oxide ($ZrO_2$), and yttrium oxide ($Y_2O_3$) as raw materials, a raw material powder was prepared to have a composition of, in terms of % by mole, 14.2% $Na_2O$, 75.4% $Al_2O_3$, 5.4% MgO, 4.9% $ZrO_2$, and 0.1% $Y_2O_3$. FIG. 5 shows a powder X-ray diffraction pattern of the raw material powder. The powder X-ray diffraction pattern was measured using an X-ray diffractometer (RINT-2000 manufactured by Rigaku Corporation). In Examples 1 to 3 and 5, a powder obtained by pre-firing the raw material powder at 1250° C. for four hours, then grinding it, and classifying the ground product was used for the preparation of a slurry. When the powder X-ray diffraction pattern of the raw material powder after being pre-fired was checked, diffraction lines originating from a hexagonal crystal (β-alumina, i.e., ($Al_{10.35}Mg_{0.65}O_{16}$) ($Na_{1.65}O$)) belonging to space group P63 and diffraction lines originating from a trigonal crystal (β"-alumina, i.e., ($Al_{10.35}Mg_{0.65}O_{16}$)($Na_{1.65}O$)) belonging to space group R-3m were confirmed. FIG. 6 shows a powder X-ray diffraction pattern of the raw material powder after being pre-fired. Furthermore, the rate of change to β" determined from the X-ray diffraction pattern was 54%. The rate of change to β" was determined in the manner as described previously. In Comparative Examples 1, 2, and 4, the raw material powder was used as it was, without pre-firing, for the preparation of a slurry.

Next, the powdered raw materials were wet mixed for four hours using ethanol as a medium. After ethanol was evaporated from the mixture, an acrylic acid ester-based copolymer (OLYCOX 1700 manufactured by Kyoeisha Chemical Co., Ltd.) as a binder and benzyl butyl phthalate as a plasticizer were used and weighed with the mixture to reach a ratio of powdered raw materials to binder to plasticizer of 83.5:15:1.5 (mass ratio) and the mixture was dispersed into N-methylpyrrolidinone, followed by well stirring with a planetary centrifugal mixer to form a slurry.

(Preparation of Green Sheet)

The slurry obtained as above was applied onto a PET film using a doctor blade and dried at 70° C., thus obtaining a green sheet.

(Pressing and Firing of Green Sheet)

Figure 7:
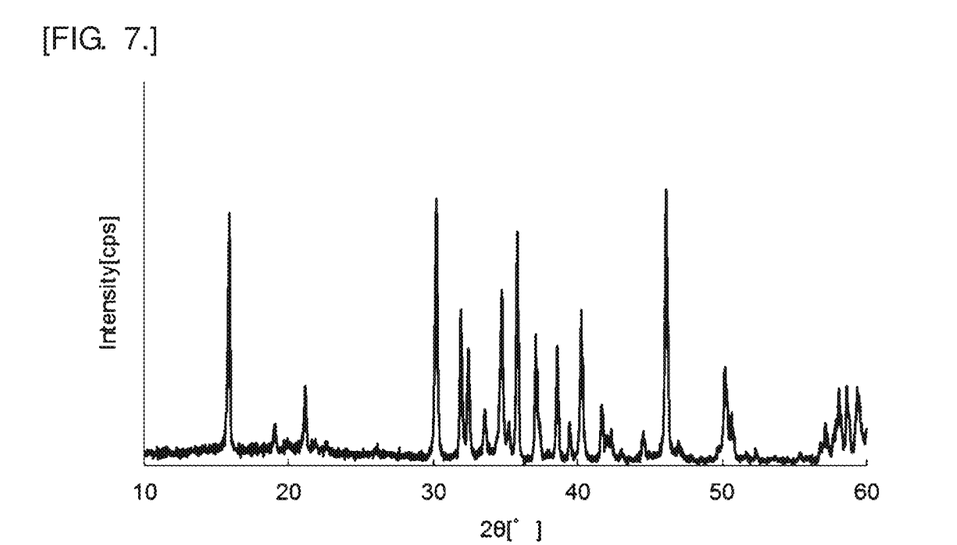
FIG. 7 is a graph showing, in the example of the solid electrolyte sheet according to the second aspect, a powder X-ray diffraction pattern of the obtained solid electrolyte sheet.

The obtained green sheet was cut into 15-mm squares and pressed at 90° C. and 40 MPa for five minutes using an isostatic pressing apparatus. The pressed green sheet was placed between an upper setter and a lower setter (both formed of a MgO sheet), a 10 μm clearance was provided between the green sheet and the upper setter, and the green sheet in this state was fired at 1600° C. for 30 minutes, thus obtaining a solid electrolyte sheet A. When the powder X-ray diffraction pattern of the solid electrolyte sheet A was checked, diffraction lines originating from a hexagonal crystal (β-alumina, i.e., ($Al_{10.35}Mg_{0.65}O_{16}$)($Na_{1.65}O$)) belonging to space group P63 and diffraction lines originating from a trigonal crystal (β"-alumina, i.e., ($Al_{10.35}Mg_{0.65}O_{16}$) ($Na_{1.65}O$)) belonging to space group R-3m were confirmed. FIG. 7 shows a powder X-ray diffraction pattern of the solid electrolyte sheet A. The rate of change to β" determined from the X-ray diffraction pattern was 82%.

(a-2) Production of Solid Electrolyte Sheet B
(Preparation of Slurry)

Using sodium carbonate ($Na_2CO_3$), yttria-stabilized zirconia ($(ZrO_2)_{0.97}(Y_2O_3)_{0.03}$), silicon dioxide ($SiO_2$), and sodium metaphosphate ($NaPO_3$), a raw material powder was formulated to have a composition of, in terms of % by mole, 25.3% $Na_2O$, 31.6% $ZrO_2$, 1% $Y_2O_3$, 33.7% $SiO_2$, and 8.4% $P_2O_5$. In Examples 4 and 6, a powder obtained by pre-firing the raw material powder at 1100° C. for eight hours, then grinding it, and classifying the ground product was used. In Comparative Examples 3 and 5, the raw material powder was used as it was, without pre-firing. Next, the powdered raw materials were wet mixed for four hours using ethanol as a medium. After ethanol was evaporated from the mixture, an acrylic acid ester-based copolymer (OLYCOX 1700 manufactured by Kyoeisha Chemical Co., Ltd.) as a binder and benzyl butyl phthalate as a plasticizer were used and weighed with the mixture to reach a ratio of powdered raw materials to binder to plasticizer of 83.5:15:1.5 (mass ratio) and the mixture was dispersed into N-methylpyrrolidinone, followed by well stirring with a planetary centrifugal mixer to form a slurry.

(Preparation of Green Sheet)

The slurry obtained as above was applied onto a PET film using a doctor blade and dried at 70° C., thus obtaining a green sheet.

(Pressing and Firing of Green Sheet)

The obtained green sheet was cut into 15-mm squares and pressed at 90° C. and 40 MPa for five minutes using an isostatic pressing apparatus. The pressed green sheet was placed between an upper setter and a lower setter (both formed of a Pt sheet), a 10 μm clearance was provided between the green sheet and the upper setter, and the green sheet in this state was fired at 1220° C. for 40 hours, thus obtaining a solid electrolyte sheet B. When the powder X-ray diffraction pattern of the solid electrolyte sheet B was checked, NASICON crystals were confirmed.

(b) Measurement of Surface Layer $Na_2O$ Concentration

A cut surface of each of the solid electrolyte sheets was measured by EDX (energy dispersive analysis by X-ray) to obtain the respective $Na_2O$ concentrations at depths of 5 μm and 20 μm from the surface of the solid electrolyte sheet.

(c) Measurement of Ionic Conductivity

After a gold electrode was formed as an ion blocking electrode on a surface of the solid electrolyte sheet, the electrode was measured within a frequency range of 1 to $10^7$ Hz by the AC impedance method to obtain a resistance value from a Cole-Cole plot. An ionic conductivity was calculated from the obtained resistance value. The measurement was conducted at 25° C.

(d) Production of Sodium Ion all-Solid-State Secondary Battery (d-1) Preparation of Precursor Powder of Positive-Electrode Active Material Crystals Using sodium metaphosphate ($NaPO_3$), ferric oxide ($Fe_2O_3$), and orthophosphoric acid ($H_3PO_4$) as raw materials, a raw material powder was formulated to have a composition of, in % by mole, 40% $Na_2O$, 20% $Fe_2O_3$, and 40% $P_2O_5$. The raw material powder was melted in an air atmosphere at 1250° C. for 45 minutes. Thereafter, the molten glass was poured between a pair of rolls and formed into a film with rapid cooling, thus preparing a precursor of positive-electrode active material crystals.

The obtained precursor of positive-electrode active material crystals was ground for five hours in a ball mill using 20-mm diameter $ZrO_2$ balls and the ground product was passed through a resin-made sieve with 120-μm openings to obtain a coarse glass powder having an average particle diameter of 3 to 15 μm. Next, the coarse glass powder was ground, using ethanol as a grinding aid, for 80 hours in a ball mill using 3-mm diameter $ZrO_2$ balls, thus obtaining a precursor powder of positive-electrode active material crystals having an average particle diameter of 0.7 μm.

To confirm precipitated active material crystals, 93% by mass precursor powder of positive-electrode active material crystals obtained as above and 7% by mass acetylene black (SUPER C65 manufactured by TIMCAL) were well mixed and the mixed powder was heat-treated at 450° C. for an hour in a mixed gas atmosphere of nitrogen and hydrogen (96% by volume nitrogen and 4% by volume hydrogen). When the powder X-ray diffraction pattern of the powder after being heat-treated was checked, diffraction lines originating from a triclinic crystal ($Na_2FeP_2O_7$) belonging to space group P-1 were confirmed.

(d-2) Preparation of Solid Electrolyte Powder A

Using sodium carbonate ($Na_2CO_3$), aluminum oxide ($Al_2O_3$), magnesium oxide (MgO), zirconium oxide ($ZrO_2$), and yttrium oxide ($Y_2O_3$) as raw materials, a raw material powder was formulated to have a composition of, in terms of % by mole, 14.2% $Na_2O$, 75.4% $Al_2O_3$, 5.4% MgO, 4.9% $ZrO_2$, and 0.1% $Y_2O_3$. The raw material powder was fired at 1250° C. for four hours in an air atmosphere. The fired powder was ground for 24 hours in a ball mill using 20-mm diameter $Al_2O_3$ balls. Thereafter, the powder was classified by air to obtain a powder having an average particle diameter D50 of 2.0 μm. The obtained powder was formed into a 30-mm diameter cylinder at a pressure of 11 MPa in a forming die, followed by heat treatment at 1600° C. for 30 minutes in an air atmosphere, thus obtaining sodium ion-conductive crystals (β"-alumina). The obtained sodium ion-conductive crystals were ground with an alumina pestle in an alumina mortar and the ground product was passed through a mesh with 300-μm openings. The obtained powder was further ground, in a planetary ball mill P6 manufactured by Fritsch GmbH and loaded with 5-mm diameter $ZrO_2$ balls, at 300 rpm for 30 minutes (with a 15-minute pause every 15 minutes), and then passed through a mesh with 20-μm openings. Thereafter, the powder was classified with an air classifier, thus obtaining a solid electrolyte powder A containing β"-alumina. The preparation of sodium ion-conductive crystals and the preparation of a sodium ion-conductive crystal powder were conducted in an environment of the dew point minus 40° C. or lower.

(d-3) Preparation of Solid Electrolyte Powder B

Using sodium carbonate ($Na_2CO_3$), yttria-stabilized zirconia ($(ZrO_2)_{0.97}(Y_2O_3)_{0.03}$), silicon dioxide ($SiO_2$), and sodium metaphosphate ($NaPO_3$), a raw material powder was formulated to have a composition of, in terms of % by mole, 25.3% $Na_2O$, 31.6% $ZrO_2$, 1% $Y_2O_3$, 33.7% $SiO_2$, and 8.4% $P_2O_5$. Next, the powdered raw materials were wet mixed for four hours using ethanol as a medium. Thereafter, ethanol was evaporated, the powdered raw materials were pre-fired at 1100° C. for eight hours and then ground, and the ground powder was classified with an air classifier (type MDS-3 manufactured by Nippon Pneumatic Mfg. Co., Ltd.). The classified powder was uniaxially pressed into shape at 11 MPa in a 30-mm diameter die and then heat-treated at 1220° C. for 40 hours to obtain a solid electrolyte containing sodium ion-conductive crystals (NASICON crystals).

The obtained solid electrolyte was ground with an alumina pestle in an alumina mortar and the ground product was passed through a mesh with 300-μm openings. The obtained powder was further ground, in a planetary ball mill P6 manufactured by Fritsch GmbH and loaded with 5-mm diameter $ZrO_2$ balls, at 300 rpm for 30 minutes (with a 15-minute pause every 15 minutes), and then passed through a mesh with 20-μm openings. Thereafter, the powder was classified with an air classifier, thus obtaining a solid electrolyte powder B containing sodium ion-conductive crystals (NASICON crystals). The preparation of sodium ion-conductive crystals and the preparation of a sodium ion-conductive crystal powder were conducted in an environment of the dew point minus 40° C. or lower.

(d-4) Production of Test Cell

A precursor powder of positive-electrode active material crystals, a solid electrolyte powder A, and acetylene black (SUPER C65 manufactured by TIMCAL) were weighed to reach, in terms of % by mass, 72%, 25%, and 3%, respectively, and these powders were mixed for approximately 30 minutes with an agate pestle in an agate mortar. An amount of 20 parts by mass of N-methylpyrrolidinone containing 10% by mass polypropylene carbonate (manufactured by Sumitomo Seika Chemicals Co., Ltd.) was added to 100 parts by mass of the mixed powder and the mixture was stirred well with a planetary centrifugal mixer to form a slurry. All the above operations were conducted in an environment of the dew point minus 40° C. or lower.

A masking tape having a 10-mm square opening and a thickness of 100 μm was attached to the surface of each of the solid electrolyte sheets A having a thickness shown in Table 3 or 4 and the slurry was applied to the masking tape-attached solid electrolyte sheet A with a squeegee and then dried at 70° C. for three hours. Next, the slurry on the solid electrolyte sheet was fired at 450° C. for an hour in a mixed gas atmosphere of nitrogen and hydrogen (96% by volume nitrogen and 4% by volume hydrogen), thus forming a positive electrode layer on the one surface of the solid electrolyte sheet. When the X-ray diffraction pattern of the obtained positive electrode layer was checked, diffraction lines originating from a triclinic crystal ($Na_2FeP_2O_7$), which is an active material crystal and belongs to space group P-1, diffraction lines originating from a hexagonal crystal (β-alumina, i.e., ($Al_{10.35}Mg_{0.65}O_{16}$) ($Na_{1.65}O$)), which is a sodium ion-conductive crystal and belongs to space group P63, and diffraction lines originating from a trigonal crystal (β"-alumina, i.e., ($Al_{10.35}Mg_{0.65}O_{16}$) ($Na_{1.65}O$)) belonging to space group R-3m were confirmed.

A current collector of a 300-nm thick gold electrode was formed on the surface of the positive electrode layer using a sputtering device (SC-701AT manufactured by Sanyu Electron Co., Ltd.). Thereafter, metallic sodium serving as a counter electrode was pressure-bonded to the other surface of the solid electrolyte sheet opposite to the surface thereof on which the positive electrode layer was formed, in an argon atmosphere of the dew point minus 60° C. or lower, and the obtained product was placed on a lower lid of a coin cell and covered with an upper lid to produce a CR2032-type test cell.

In Example 4 and Comparative Example 3, a test cell was produced in the same manner as described above except that the solid electrolyte sheet B having a thickness shown in Table 3 or 4 was used instead of the solid electrolyte sheet A. In Example 5 and Comparative Example 4, a test cell was produced in the same manner as described above except that the solid electrolyte powder B was used instead of the solid electrolyte powder A. In Example 6 and Comparative Example 5, a test cell was produced in the same manner as described above except that the solid electrolyte sheet B having a thickness shown in Table 3 or 4 was used instead of the solid electrolyte sheet A and the solid electrolyte powder B was used instead of the solid electrolyte powder A.

(d-5) Charge and Discharge Test

A charge and discharge test was conducted at 30° C. using each of the obtained test cells to measure the discharge capacity. The results are shown in Tables 3 and 4. In the charge and discharge test, charging (release of sodium ions from the positive-electrode active material) was implemented by CC (constant-current) charging from the open circuit voltage (OCV) to 4.3 V and discharging (absorption of sodium ions to the positive-electrode active material) was implemented by CC discharging from 4.3 V to 2 V. The C rate was 0.01 C. The discharge capacity in Tables 3 and 4 means the first discharge capacity evaluated at a C rate of 0.01 C.

In Examples 1 to 6, the difference $C_2-C_1$ between the $Na_2O$ concentration $C_1$ at a depth of 5 μm from a surface of the solid electrolyte sheet and the $Na_2O$ concentration $C_2$ at a depth of 20 μm from the surface of the solid electrolyte sheet was as small as 0.4 to 1.4% by mole, and, with the thickness of the solid electrolyte sheet as 100%, the difference $C_2'-C_1'$ between the $Na_2O$ concentration $C_1'$ at a depth of 5% from the surface of the solid electrolyte sheet and the $Na_2O$ concentration $C_2'$ at a depth of 50% from the surface of the solid electrolyte sheet was as small as 0.2 to 1.6% by mole. Therefore, the ionic conductivity was as large as $0.3 \times 10^{-3}$ to $5.1 \times 10^{-3}$ S/cm. Hence, in the cells in which the above solid electrolytes were used, their discharge capacity was as large as 34 to 47 mAh/g and their volume energy density was as large as 13.5 to 63.5 mWh/cm$^3$.

On the other hand, in Comparative Examples 1 to 5, the difference $C_2-C_1$ between the $Na_2O$ concentration $C_1$ at a depth of 5 μm from a surface of the solid electrolyte sheet and the $Na_2O$ concentration $C_2$ at a depth of 20 μm from the surface of the solid electrolyte sheet was as large as 10.6 to 11.6% by mole, and, with the thickness of the solid electrolyte sheet as 100%, the difference $C_2'-C_1'$ between the $Na_2O$ concentration $C_1'$ at a depth of 5% from the surface of the solid electrolyte sheet and the $Na_2O$ concentration $C_2'$ at a depth of 50% from the surface of the solid electrolyte sheet was as large as 11.1 to 12.1% by mole. Therefore, the ionic conductivity was as small as $0.0001 \times 10^{-3}$ to $0.08 \times 10^{-3}$ S/cm. Hence, in the cells in which the above solid electrolytes were used, their discharge capacity was as small as 1 to 7 mAh/g and their volume energy density was as small as 0.9 to 9.0 mWh/cm$^3$.

INDUSTRIAL APPLICABILITY

The solid electrolyte sheet according to the present invention is suitable not only for use in batteries, including a sodium ion all-solid-state secondary battery and a sodium-sulfur battery, but also as solid electrolytes for gas sensors, including a $CO_2$ sensor and an $NO_2$ sensor.

The invention claimed is:

1. A solid electrolyte sheet containing at least one type of sodium ion-conductive crystal selected from β"-alumina and NASICON crystal, the solid electrolyte sheet having a thickness of 500 μm or less and a flatness of 200 μm or less.

2. A solid electrolyte sheet containing at least one type of sodium ion-conductive crystal selected from β"-alumina and NASICON crystal, wherein when $C_1$ represents a $Na_2O$ concentration at a depth of 5 μm from a surface of the solid electrolyte sheet and $C_2$ represents a $Na_2O$ concentration at a depth of 20 μm from the surface, $C_2-C_1 \leq 10\%$ by mole.

3. A solid electrolyte sheet containing at least one type of sodium ion-conductive crystal selected from β"-alumina and NASICON crystal, wherein when, with a thickness of the solid electrolyte sheet represented as 100%, $C_1'$ represents a $Na_2O$ concentration at a depth of 5% from a surface of the solid electrolyte sheet and $C_2'$ represents a $Na_2O$ concentration at a depth of 50% from the surface, $C_2'-C_1' \leq 10\%$ by mole.

4. The solid electrolyte sheet according to claim 2, having a thickness of 500 μm or less.

5. The solid electrolyte sheet according to claim 1, containing, in terms of % by mole, 65 to 98% $Al_2O_3$, 2 to 20% $Na_2O$, 0.3 to 15% $MgO+Li_2O$, 0 to 20% $ZrO_2$, and 0 to 5% $Y_2O_3$.

6. The solid electrolyte sheet according to claim 1, containing crystals represented by a general formula $Na_sA1_tA2_uO_v$ (where A1 is at least one selected from Al, Y, Yb, Nd, Nb, Ti, Hf, and Zr, A2 is at least one selected from Si and P, s=1.4 to 5.2, t=1 to 2.9, u=2.8 to 4.1, and v=9 to 14).

7. The solid electrolyte sheet according to claim 1, for use in an all-solid-state sodium ion secondary battery.

8. An all-solid-state secondary battery comprising a positive electrode composite layer, a solid electrolyte layer, and a negative electrode composite layer, the solid electrolyte layer being formed of the solid electrolyte sheet according to claim 1.

9. A method for producing the solid electrolyte sheet according to claim 1, the method comprising the steps of:
   (a) pre-firing a raw material powder;
   (b) making the pre-fired raw material powder into a slurry;
   (c) applying the slurry on a support and drying the slurry to obtain a green sheet; and
   (d) firing the green sheet to form sodium ion-conductive crystals.

10. The method for producing the solid electrolyte sheet according to claim 9, wherein the green sheet is fired on an MgO setter.

11. The method for producing the solid electrolyte sheet according to claim 9, wherein in the step (d), the firing is performed in a state where the green sheet is placed between an upper setter and a lower setter and a clearance is provided between the green sheet and the upper setter.

12. The method for producing the solid electrolyte sheet according to claim 11, wherein the clearance is 1 to 500 μm.

13. The solid electrolyte sheet according to claim 1, having a thickness of 400 μm or less.

* * * * *